Dec. 3, 1935.  W. HEINS  2,022,718
LATCHING MEANS FOR QUICKLY DETACHABLE ROOF CLOSURES
Filed Jan. 23, 1934
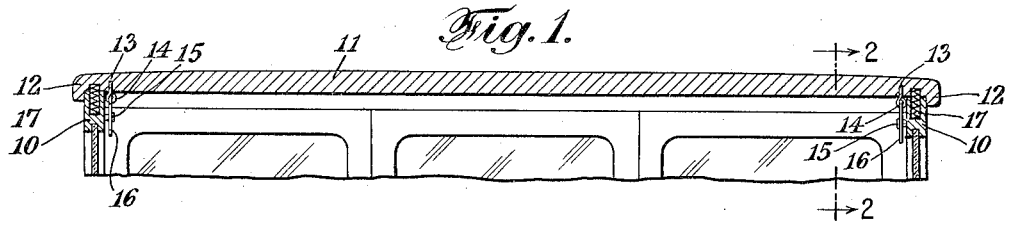
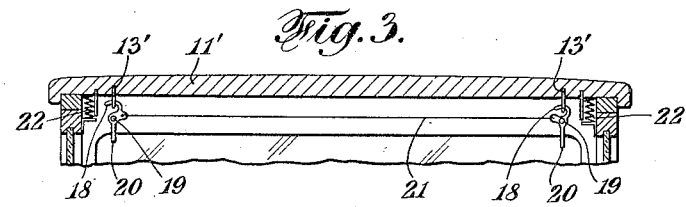
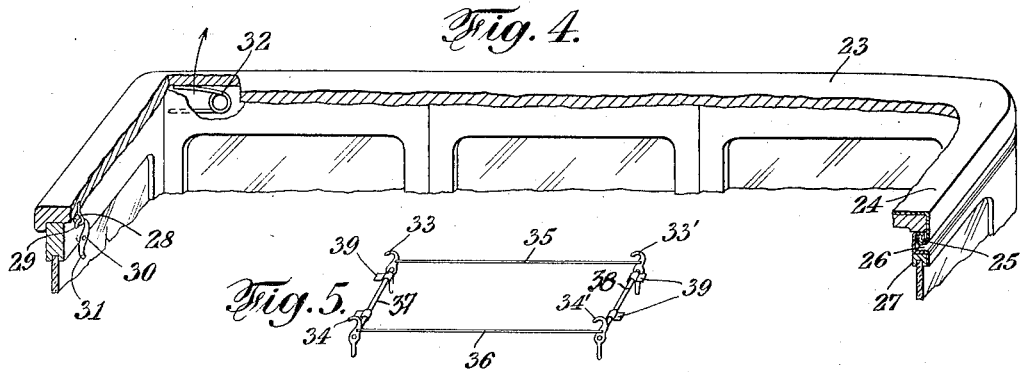
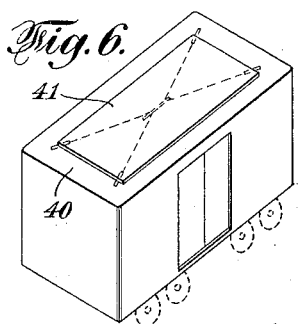
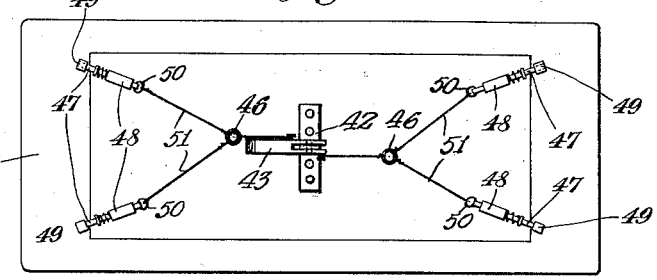
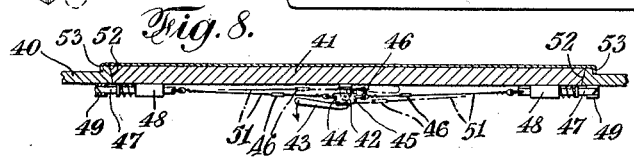
INVENTOR
William Heins.
BY Paul M. Klein
his ATTORNEY Patented Dec. 3, 1935

2,022,718

UNITED STATES PATENT OFFICE 2,022,718

LATCHING MEANS FOR QUICKLY DETACHABLE ROOF CLOSURES

William Heins, Maspeth, N. Y.

Application January 23, 1934, Serial No. 707,877

1 Claim. (Cl. 292—38)

The present invention relates to vehicle roofs in general, and particularly to means for providing an emergency exit in the event of an accident during which a vehicle either turns over on one side, or is submerged in water, whereby access through the doors or windows is made impossible.

The prime object of this invention is to provide a practical safety exit for vehicles through the roof thereof, without materially increasing their cost of manufacture.

Another object of this invention is to so construct the roof of a vehicle, that either the entire roof, or a substantial portion thereof may be wholly and quickly removed without the employment of tools or other agencies.

Another object of this invention is to provide in conjunction with a removable roof structure quick-action locking devices or detents adapted to be instantly operable from within the vehicle by either an occupant or by a person outside, reaching into the vehicle through either a window or an emergency opening.

Another object of this invention is to so construct the locking devices or detents of the roof construction, that all of them may be actuated simultaneously from one point within the vehicle, such actuating means being made easily accessible from within or from without.

The foregoing and numerous other objects will become more fully apparent from the following description and the drawing, illustrating several forms of my invention to demonstrate a few of the possible ways which may be employed to accomplish the desired results. They, however, are not intended to limit me to the designs shown.

In the drawing,

Figure 1 is a longitudinal cross section of the roof portion of a vehicle.

Figure 2 is cross sectional view taken on lines 2—2.

Figure 3 illustrates a modified form of my invention similar to that shown in Fig. 2.

Figure 4 is a partial perspective illustration of a hinged, removable roof.

Figure 5 is a diagrammatical illustration of a locking arrangement for a roof.

Figure 6 illustrates a railroad car provided with a removable emergency inlay roof.

Figure 7 is a bottom view of an independent removable roof structure; and

Figure 8 is a typical cross section through a removable inlay roof structure such as shown in Figure 7.

Referring now specifically to the illustrations, numeral 10 denotes the body frame of the vehicle upon which rests roof 11, its edges 12 overlapping the frame structure so as to form a tight joint between the body and the roof. Secured in the roof member are rings 13 or other suitable means for receiving hooks 14, pivoted at 15 and provided with operating handles 16. Within the upper edge of the vehicle body I preferably provide a plurality of springs 17 intended for two purposes, firstly for assisting in the removal of the roof when hooks 14 are operated, and secondly for keeping the roof under constant tension, thereby preventing its locking hooks from shaking loose.

A somewhat similar construction is illustrated in Fig. 3 with the exception that detent receiving means or rings 13', depending from roof member 11', are engaged by hooks 18 and 18', which are pivoted at 19 and possess operating handles 20. These hooks are connected with one another by means of a rod or cord 21, which latter is intended to transmit the motion of one hook to the other hook, when one of the hooks is being actuated, thereby establishing simultaneous operation, which may become of supreme importance in case of emergency.

In order to facilitate the removal of the roof when the hooks are set to disengaging position relative to rings 13', spring means 22 are arranged at intervals along the contacting portions of the vehicle frame and the roof.

In Fig. 4 is shown a modified arrangement of the device in which the attachment of the roof is in the form of an open hinge-resembling construction at one edge of the roof, while the opposite edge is held in locked position by any convenient detent member, such as described above. In this figure numeral 23 indicates the roof structure at one edge 24 of which is formed a half-round hinge member 25. The latter is engaged by a co-acting half-round hinge member 26, extending from one edge of the vehicle body 27. At the opposite edge of the roof there is secured one or more detent receiving means 28, engageable by one or more hooks 29, pivoted at 30 and operable by handle 31.

When hook 29 releases ring 28 the roof is swung in the direction of the arrow. A relatively slight change in the position of the upper half-hinge member 25 is sufficient to permit the removal of the entire roof. For facilitating the lifting off of the edge, locked in position by hook 29, spring means 32 are provided beneath the roof structure.

In Fig. 5 is illustrated an arrangement for simultaneously operating four detents, irrespective of the fact which one of the hooks is actuated. This construction resembles the one described in connection with Fig. 3, where only two hooks are shown. These two hooks would correspond to either the pair of hooks marked 33 and 33' or to that indicated at 34 and 34', both pairs being connected by operating rods 35 and 36. The fulcrums or pivotal points of hooks 33 and 34, and 33' and 34' are in the form of rods 37 and 38, which rigidly connect the respective hook structures and are adapted to rotate bodily in bearings 39 adapted to be attached to the vehicle body.

In Figures 6, 7 and 8 is illustrated a modified form of my invention, in which only a portion of the roof is removable; however, that portion is of sufficient dimensions so as to allow easy access to or exit from the vehicle in case of an emergency. The picture of a railroad car in Fig. 6 is shown for the purpose of indicating that my device is not limited to automobiles, trucks or similar small vehicles, but that it may be employed elsewhere. The principle of this modification resides in providing within a roof structure an insertable portion held from within the vehicle to the roof portions surrounding it. The roof is indicated at 40, whereas the removable roof structure is shown at 41. Forming parts of or connected with the latter are locking devices consisting, for example, of a bracket 42, located centrally, in which is operatively mounted an operating lever 43. Adjacent to the pivotal portion of the lever there are two extensions 44 and 45 provided with means to which are secured rings 46.

Near each corner of roof structure 41 are disposed spring controlled detents 47, slidably mounted in housings 48. Registering with the positions of the detents are detent receiving means 49 secured to the edges of the outer roof portions.

At the inner ends of the detents are provided rings 50 or any other suitable means to which operating cables or rods 51 may be secured, so as to form connections between the detents and ring attachments 46 of lever 43. This lever is shown in full lines, indicating its inactive position. When the lever is turned downwards, the extensions change their positions and exert a pull through rods 51 upon the detents, causing the latter to leave their sockets or receiving means 49, thus freeing the removable roof structure and permitting it to be lifted.

Obviously, as soon as lever 43 is released, the detent springs cause the detents to revert to their projected position. If that is not desired, the lever may be swung in a plane substantially perpendicular to removable panel 41, within substantially 180 deg. to its broken-line position in which it will remain, unless manually brought to its normal place, due to the fact that the connecting points between lever extensions 44 and 45, and connecting means 51, attached to the detents 48, will assume an over-center positon with respect to the pivotal point of lever 43. When the lever and its extensions are swung to that position, all detents will remain inoperative, or unlocked. Obviously, bracket 42 is so constructed as to facilitate the operation of the lever and its extensions in the manner stated.

In order to assure a tight fit with the roof portions, I preferably construct the engaging faces of the removable and stationary roof parts on a slant, as indicated at 52, and to prevent water or dust from entering the vehicle I provide overlapping edges shown at 53.

The foregoing description of the different forms of my invention depicts only a few possible ways of construction. It is obvious, therefore, that the problem of an emergency outlet through the roof of vehicles may be solved in many other ways. Consequently, I shall not be limited by my present disclosure to the actual structure illustrated and I reserve for myself the right to make changes and improvements, without departing from the broad scope of my invention, as set forth in the annexed claim.

I claim:

In a quickly detachable roof structure for vehicles, securing means therefor, comprising a hand lever, pivotally secured substantially at the center of the structure and provided with oppositely disposed operating extensions near its pivotal point, a plurality of detents, normally in interlocking engagement with the body of the vehicle, secured peripherally at the inner side of the structure, means operatively connecting said detents with said lever extensions, a mounting for said lever permitting the swinging of the latter to a predetermined point within substantially a half circle, in a plane perpendicular to said structure for simultaneously unlocking said detents, said lever being so mounted, that when swung to its extreme position, the connecting points between the lever extensions and said connecting means assume an over centre position with respect to the pivotal point of lever, for maintaining the detents unlocked.

WILLIAM HEINS.